United States Patent
Kim et al.

(10) Patent No.: US 7,724,317 B2
(45) Date of Patent: May 25, 2010

(54) LIQUID CRYSTAL DISPLAY DEVICE WITH A MAIN SUPPORT FRAME HAVING SLIDE GROOVE PORTIONS THEREIN AND A FIRST UPPER COVER HAVING SLIDE PROTRUSIONS THEREIN INSERTED INTO THE SLIDE GROOVE PORTIONS, AND METHOD OF FABRICATING THEREOF

(75) Inventors: Tae-Woo Kim, Gyeonggi-Do (KR);
Gi-Bin Kim, Gyeonggi-Do (KR);
Hak-Mo Hwang, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 147 days.

(21) Appl. No.: 11/987,352

(22) Filed: Nov. 29, 2007

(65) Prior Publication Data

US 2008/0129918 A1 Jun. 5, 2008

(30) Foreign Application Priority Data

Nov. 29, 2006 (KR) ...................... 10-2006-0119367

(51) Int. Cl.
*G02F 1/1333* (2006.01)
(52) U.S. Cl. ...................................... 349/58
(58) Field of Classification Search ............ 349/58, 349/59, 60
See application file for complete search history.

(56) References Cited

U.S. PATENT DOCUMENTS

| 7,131,623 | B2* | 11/2006 | Alric et al. ............... 248/694 |
| 2004/0004680 | A1* | 1/2004 | Kim ............................ 349/58 |
| 2004/0109104 | A1* | 6/2004 | Lee ............................. 349/58 |
| 2004/0183958 | A1* | 9/2004 | Akiyama et al. ............. 349/58 |
| 2005/0259191 | A1* | 11/2005 | Park et al. .................... 349/58 |
| 2007/0047265 | A1* | 3/2007 | Kang et al. ................. 362/634 |

FOREIGN PATENT DOCUMENTS

CN 1360252 7/2002

* cited by examiner

*Primary Examiner*—Andrew Schechter
*Assistant Examiner*—Dennis Y Kim
(74) *Attorney, Agent, or Firm*—Morgan Lewis & Bockius LLP

(57) ABSTRACT

Disclosed is an improved LCD device for preventing moisture infiltrating into the LCD device, including: A liquid crystal panel; A backlight assembly provided with a lamp and a reflection sheet for supplying light to the liquid crystal panel; a main support frame for receiving the liquid crystal panel and the back light assembly therein, and having slide grooves portions therein; a lower cover formed at an opened side of the main support frame where a lamp of the back light assembly is disposed; and a first upper cover for covering one side of the main support frame and having slides protrusion portions therein, wherein the slide protrusion portions are coupled to the slide groove portions formed in the main support frame.

17 Claims, 6 Drawing Sheets

LIQUID CRYSTAL DISPLAY DEVICE WITH A MAIN SUPPORT FRAME HAVING SLIDE GROOVE PORTIONS THEREIN AND A FIRST UPPER COVER HAVING SLIDE PROTRUSIONS THEREIN INSERTED INTO THE SLIDE GROOVE PORTIONS, AND METHOD OF FABRICATING THEREOF

CROSS-REFERENCE TO RELATED APPLICATIONS

The present disclosure relates to a subject matter contained in priority Korean Application No. 10-2006-0119367, filed on Nov. 29, 2006, which is herein expressly incorporated by reference in its entirety.

BACKGROUND

The present invention relates to an LCD (liquid crystal display) device, and more particularly, to an LCD device which is capable of minimizing a screen defects due to wrinkling of an optical sheet resulting from infiltration of moisture thereinto, by preventing moisture from being introduced into the LCD device.

Generally, LCD devices have a wide range of application in portable computers such as notebook and laptop computers, office automation (OA) equipment, audio/video devices and so on because they are light, thin and have low power consumption characteristics.

Typically, the LCD device has a function that displays images on a screen by controlling of optical transmittance according to video signals applied to a plurality of controlling switching devices aligned in a matrix format.

The LCD device includes a liquid crystal panel having a color filter as a front substrate and a thin film transistor array as a rear substrate, which are disposed to face each other, and a liquid crystal layer interposed between the substrates, and a drive unit supplying scanning signals and image information to the liquid crystal panel to operate the liquid crystal panel. Also, front and rear polarizers are disposed at front and rear portions of the liquid crystal panel, respectively.

Because the LCD device is a non-spontaneous light emitting device that cannot emit light spontaneously, comparing with a CRT (cathode-ray tube) or an LED (light-emitting diode), a light source such as a lamp, etc. is employed for supplying light onto the liquid crystal panel so as to implement an image display. Thus, the transmission type LCD device is provided with a back light assembly as the light source supplying light onto the liquid crystal panel.

Typically, the liquid crystal panel and the back light assembly are fabricated through separate processes and then physically coupled together in an integrated form as a module, for thereby avoiding light leakage therebetween and for better resisting an external impact. Such coupling together of the liquid crystal panel and the back light assembly is implemented by a case. Typically, the case is coupled in a form that covers the back light assembly including edges of the liquid crystal panel.

Figure 1:
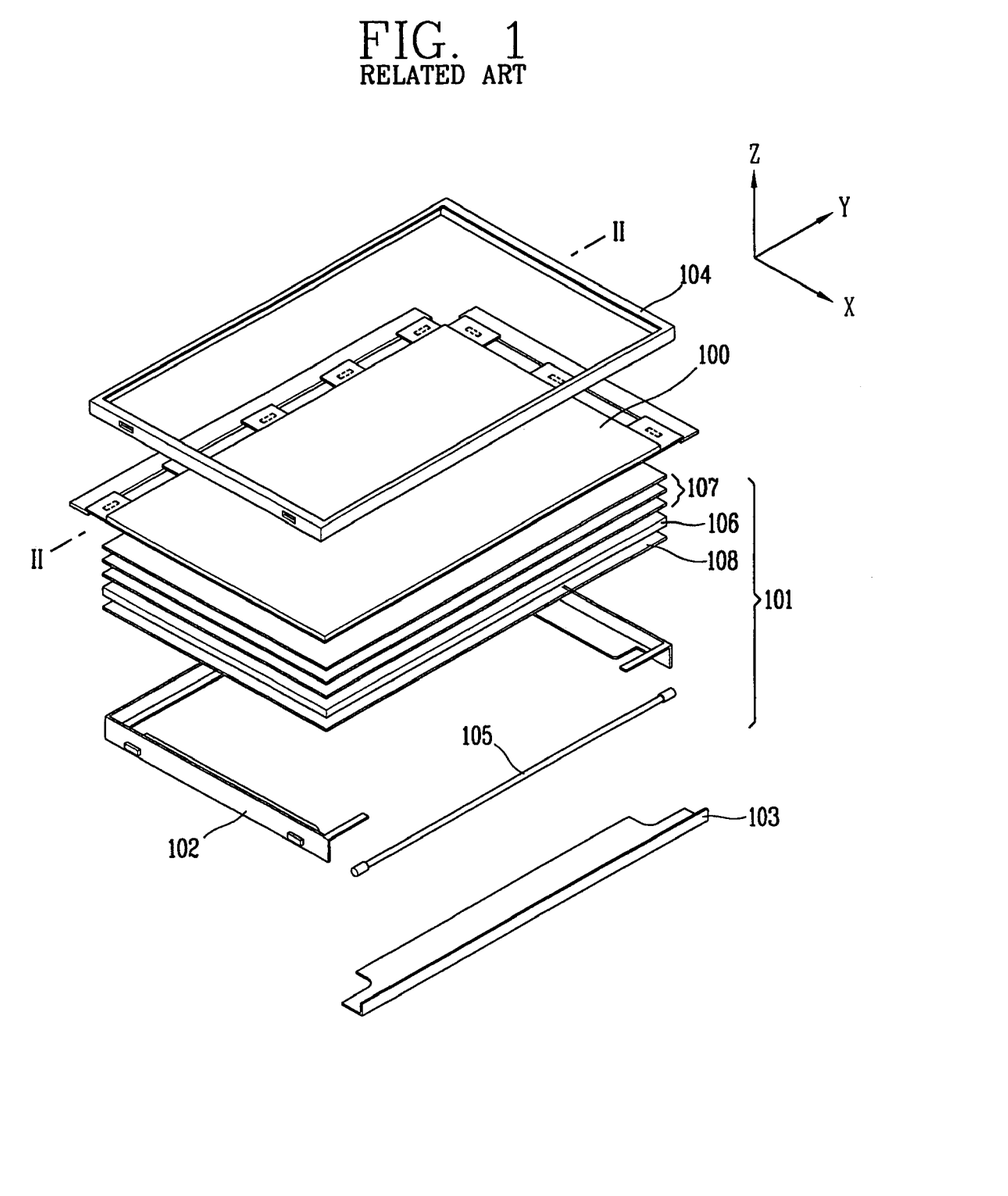
FIG. 1 is an exploded perspective view showing a related art LCD device.
Figure 2:
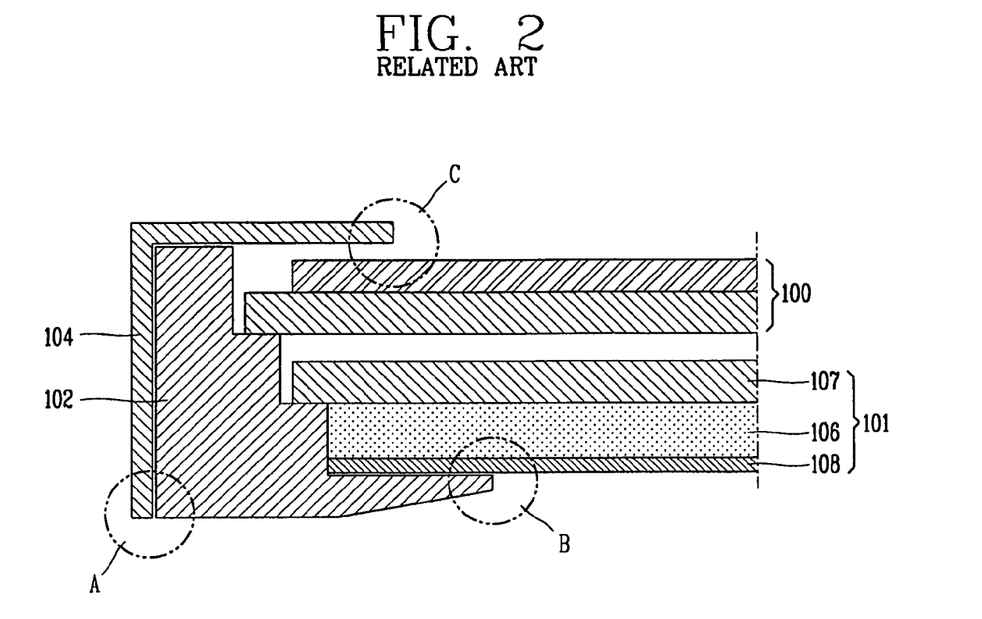
FIG. 2 is a cross-sectional view taken along line II-II in FIG. 1.

FIG. 1 is an exploded perspective view showing a related art LCD device, and FIG. 2 is a cross-sectional view taken along line II-II in FIG. 1.

As shown in FIGS. 1 and 2, the related art LCD device includes a liquid crystal panel 100, a back light assembly 101 provided with a lamp 105 for supplying light onto the liquid crystal panel 100, a main support frame 102 receiving the liquid crystal panel 100 and the back light assembly 101, a lower cover 103 disposed at an opened long side of the main support frame 102 where the lamp 105 is disposed for enabling access for replacement of the lamp 105, and an upper cover 104 covering edges of the liquid crystal panel 100 and the main support frame 102.

The back light assembly 101 includes the lamp 105, a light guide plate 106 guiding the light emitted from the lamp 105 toward the liquid crystal panel 100, an optical sheet 107 located at a front surface of the light guide plate 106 for diffusing and collecting the light, and a reflection sheet 108 located at a rear surface of the light guide plate 106 for reflecting the light emitted from the lamp 105 toward the liquid crystal panel 100.

The LCD device constructed as described above may suffer a problem in that over time a gap can arise due to loosening or deformation of the coupling portions between the liquid crystal panel 100 and the back light assembly 101, and then, moisture may infiltrate into the LCD device, causing defects in the LCD device.

Gaps between the liquid crystal panel 100 and the back light assembly 101 can occur at several locations, but, as shown in FIG. 2, typically occur at the portions indicated at A, B and C. The portions A, B and C are the portions are those locations where gaps can occur due to use of the LCD device.

Here, portion A refers to a gap arising between an outer peripheral surface of the main support frame 102 and an inner lateral peripheral surface of the upper cover 104, portion B refers to a gap arising between an internal stepped portion of the main support frame 102 and a rear surface of the reflection sheet 108, and portion C refers to the gap arising between an inner upper surface of the upper cover 104 and a front surface of the liquid crystal panel 100.

The locations A, B and C provide paths for moisture to infiltrate into the LCD device under a humid environment. Such introduction of moisture can cause the deformation of the optical sheet 107, whereby, when the LCD device is driven, the screen display may be defective. This problem is especially of concern in relation to LCD modules employed in portable devices where exposure to humid conditions as well as conditions promoting condensation of moisture may be encountered.

Also, although not shown in FIG. 2, gaps may also arise at a location where the rear surface of the reflection sheet 108 and the inside of the lower cover 103 contact with each other, thereby acting as a path for moisture infiltration into the LCD device Moisture is mostly introduced at location A among the above four locations. However, moisture infiltration through locations other than at A cannot be overlooked.

Meanwhile, as it is required for the LCD devices to become increasingly lighter and thinner, related research is being actively conducted. But, these ultra light and thin LCD devices generally use much thinner and lighter optical sheets, comparing with the general LCD device. Accordingly, when moisture is infiltrated thereinto, the optical sheet in such ultra light and thin LCD devices may be very easily deformed, comparing with that in the general LCD devices, thereby deteriorating the quality of a screen display of the LCD device.

SUMMARY

Therefore, it is an object of the present invention to provide an LCD device which is capable of preventing moisture from being introduced into the LCD device by blocking paths for the infiltration of moisture, by transforming a main support frame and a front cover.

To achieve this object, the present invention is directed to providing an LCD device comprising: a liquid crystal panel; a backlight assembly provided with a lamp and a reflection sheet for supplying light to the liquid crystal panel; a main support frame for receiving the liquid crystal panel and the back light assembly therein, and having slide grooves portions therein; a lower cover formed at an opened side of the main support frame where a lamp of the back light assembly is disposed; a first upper cover for covering one side of the main support frame and having slides protrusion portions therein, wherein the slide protrusion portions are coupled to the slide groove portions formed in the main support frame; a second upper cover for covering an other side of main support frame; and a waterproof pad disposed between an inner portion of the first upper cover and an upper surface of the liquid crystal panel, and disposed between an inner portion of the second cover and the upper surface of the liquid crystal panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiment of the invention and together with the description serve to explain the principles of the invention.

In the drawings.

DETAILED DESCRIPTION

Hereinafter, description will be given in detail of the preferred embodiments of the present invention, examples of which are illustrated in the accompanying drawings. Referring to the drawings, like numerals indicate like elements and the same reference numerals appearing in more than one drawing figure refer to the same elements.

Figure 3:
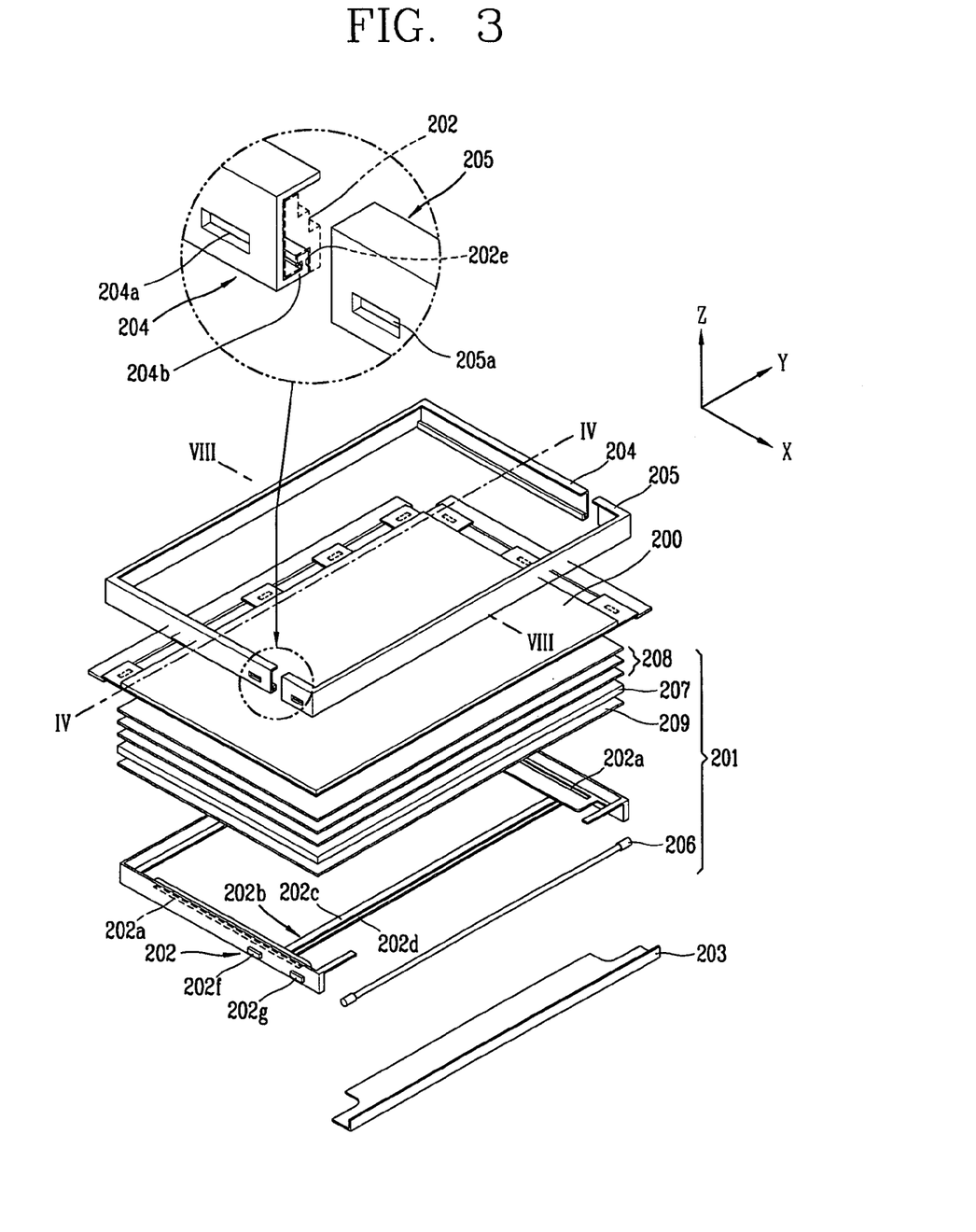
FIG. 3 is an exploded perspective view showing an LCD device in accordance with the present invention.
Figure 4:
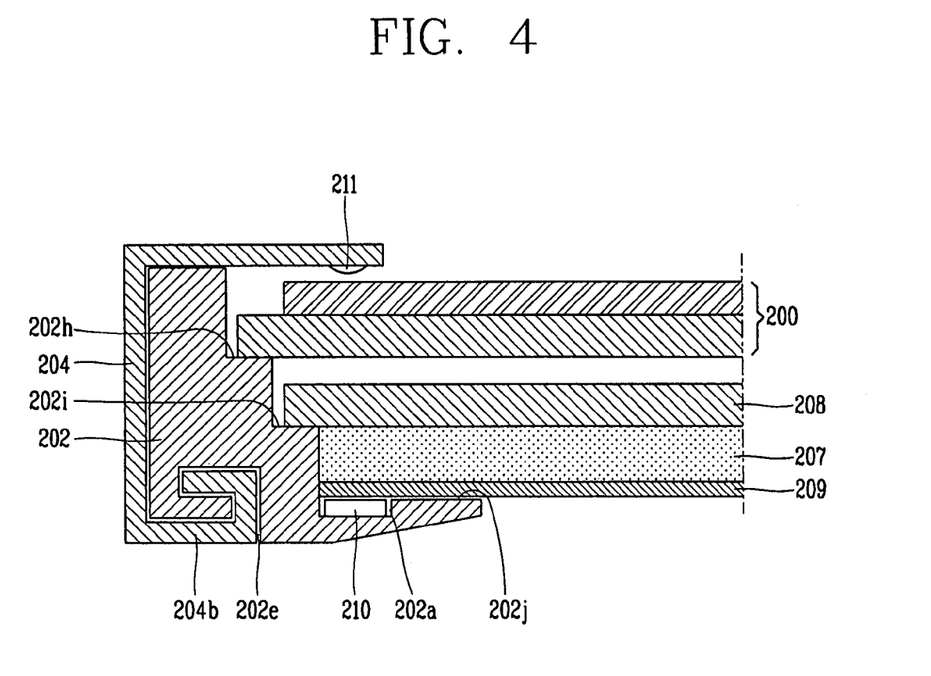
FIG. 4 is a cross-sectional view taken along line IV-IV in FIG. 3.

FIG. 3 is an exploded perspective view showing an LCD device in accordance with the present invention, and FIG. 4 is a cross-sectional view taken along line IV-IV in FIG. 3.

The magnified partial cutaway view in FIG. 3 shows that a slide groove portion 202e of a rectangular main support frame 204 (shown in phantom lines and cutaway so as to reveal its cross-sectional profile) is slidingly coupled to a slide corresponding protrusion portion 204b on each short side of a rectangular first upper cover 204. Namely, as shown within the phantom lines in the magnified partial view in FIG. 3, the main support frame 202 is coupled to the inside of the first upper cover 204 which is cut at its short sides in a longitudinal direction thereof, whereby one long side of the first upper cover 204 is opened. This open side of the first upper cover 204 is closed by a corresponding second upper cover 205 (which may also slidably be coupled, by means of slide protrusions thereon) to the other long side portion of the main support frame 202.

As shown in FIGS. 3 and 4, the LCD device in accordance with the present invention includes: a liquid crystal panel 200, a back light assembly 201 provided with a lamp 206 and a reflection sheet 209 for supplying light to the liquid crystal panel 200, the main support frame 202 receiving the liquid crystal panel 200 and the back light assembly 201, and having the slide groove portion 202e therein, a lower cover 203 formed at one open long side thereof in a length direction of the main support 202 where the lamp 206 is disposed, and the first upper cover 204 covering one side of the main support frame 202 and having at each short side thereof a slide protrusion portion 204b provided thereon, wherein the slide protrusion portions 204b are coupled to the slide groove portions 202e formed at the main support frame 202.

The back light assembly 201 includes the lamp 206, a light guide plate 207 for directing a progressing direction of light from the lamp 206 toward the liquid crystal panel 200; an optical sheet 208 located at a front surface of the light guide plate 207 for diffusing and collecting the light, and a reflection sheet 209 located at a rear surface of the light guide plate 207 for reflecting any light leaked from the light guide plate 207.

Although not shown in detail in the drawings, the optical sheet 208 includes a diffusion sheet, one or more prism sheets, and a protection sheet.

The light emitted from the lamp 206 is directed toward the liquid crystal panel 200 by the reflection sheet 209 and the light guide plate 207, and passes through a plurality of optical sheets 208, whereby the light is made to have a uniform brightness and supplied to the liquid crystal panel 200.

The main support frame 202 receiving the liquid crystal panel 200 and the back light assembly 201 is typically formed by molding a synthetic resin. Even though the main support frame 202 is shown implemented as a nearly rectangular frame having one opened long side, it is not limited to such configuration, but various modifications may be implemented according to the applications.

One or more inwardly stepped portions for fixing the liquid crystal panel 200 and the back light assembly 201 are formed in the inside wall of the main support frame 202.

As shown in FIG. 4, although three stepped portions 202h, 202i, 202j are shown, that is, a first stepped portion 202h for fixing the liquid crystal panel 200, a second stepped portion 202i for fixing the optical sheet 208 and a third stepped portion 202j for fixing the light guide plate 207 and the reflection sheet 208 are shown provided on the main support frame 202, the number of the stepped portions is not limited to any specific number.

As shown in FIG. 4, the slide groove portions 202e formed in the main support frame 202 has a first leg formed extending inwardly from a rear surface of the main support frame 202, and has a second leg extending perpendicularly outwardly therefrom, parallel to the rear surface of the main support frame 202 to form an "L" shape in cross-sectional profile.

Here, each of the slide groove portions 202e extends along the entire short side of the main support 202 in a width direction (i.e., the X-axis direction in FIG. 3), thereby being exposed at at least one long side surface of the main support frame 202.

The lower cover 203 is coupled to the main support frame 202 at the one opened side edge of the main support frame 202 along a part of the adjacent rear surface thereof. That is, the lower cover 203 is formed with a first plate portion for covering the open rear surface of the main support frame 202 and with a second plate portion that is extended from the first plate portion and upwardly bent perpendicularly thereto so as to enclose the opened long side of the main support frame 202 for preventing deformation of the main support frame 202 and protecting the lamp 206.

Meanwhile, the upper cover including a first upper cover 204 and the second upper cover 205, located at an upper portion of the liquid crystal panel 200 serves to couple the liquid crystal panel 200 with the back light assembly 201, and, the slide protrusion portions 204b are formed therein in a complementary shape corresponding to the slide groove portions 202e in the main support frame 202. Here, one end of each slide groove portion 202e in the main support frame 202 and one end of each slide protrusion portion 204b of the first upper cover 204 are aligned with each other, and then the first upper cover 204 is slid in a vertical direction over the main support frame 202 (that is, in the X-axis direction in FIG. 3) for implementing the sliding coupling therebetween.

After the first upper cover 204 is coupled to the main support frame 202, the second upper cover 205 may also be coupled to the main support frame 202 in the vertical direction (that is, the –X-axis direction in FIG. 3), same as the first upper cover 204, or the second upper cover 205 may be coupled to the main support 202 in a vertical direction. That is, the second upper cover 205 may alternatively be coupled to the main support frame 202 from above (that is, in the –Z-axis direction in FIG. 3).

First and second coupling slots or indentations 204a and 205a are formed in end portions of the first upper cover 204 and second upper cover 205, respectively. And, first and second coupling tabs of projections 202f and 202g are respectively formed at areas corresponding to the first and second coupling slots 204a, 205a on the main support 202 that are coupled with the first and second upper covers 204, 205.

The first and second coupling slots 204a and 205a are coupled to the first and second coupling tabs 202f and 202g, respectively, when the first and second upper covers 204, 205 are coupled to the main support frame 202, respectively, thereby closely fixing the first and the second upper covers 204, 205 to the main support frame 202.

Here, in the above description of the present invention, the first and second coupling slots 204a, 205a have an aperture or concave shape, and the first and second coupling tabs 202f, 202g have a convex protruded shape so as to be coupled into the first and second coupling slots 204a, 205a. However, the present invention is not limited thereto, and various modifications may be implemented according to the applications.

The first upper cover 204 and the second upper cover 205 are tightly adhered to each other, and thus they are closely fixed to the main support frame 202.

In detail, in accordance with the present invention, the slide protrusion portions 204b of the first upper cover 204 are coupled into the slide groove portions 202e in the main support frame 202, thereby preventing moisture from being introduced into the main support frame 202. As such, in the present invention, the slide groove portions 202e are bent or folded at least one time, and accordingly a pathway for moisture infiltration into the main support frame 202 is extended in a serpentine fashion, for thereby preventing the moisture introduction.

That is, because the pathway for moisture infiltration into the LCD device is extended, thus moisture cannot be introduced into the LCD device. In this respect, preferably, the length of the slide groove portions 202e and slide protrusion portions 204b is made longer and the number of bendings or foldings of the slide groove portion 202e and slide protrusion portions 204b is more.

However, the slide groove portions 202e serve not only for extending the moisture infiltration pathways, but also for performing coupling between the upper cover portions 204, 205 and the main support frame 202. Accordingly, if the length and bending of the slide groove portions 202e and slide protrusion portions 204b is implemented in an excessive degree, it may not be easy to implement the coupling due to increasing of the frictional forces at the slide groove portions 202e and the slide protrusion portions 204b.

Therefore, the length and the bending of the slide groove portions 202e should be properly designed considering the prevention of moisture introduction and the coupling of the upper cover portions 204, 205 and the main support frame 202.

Figure 5:
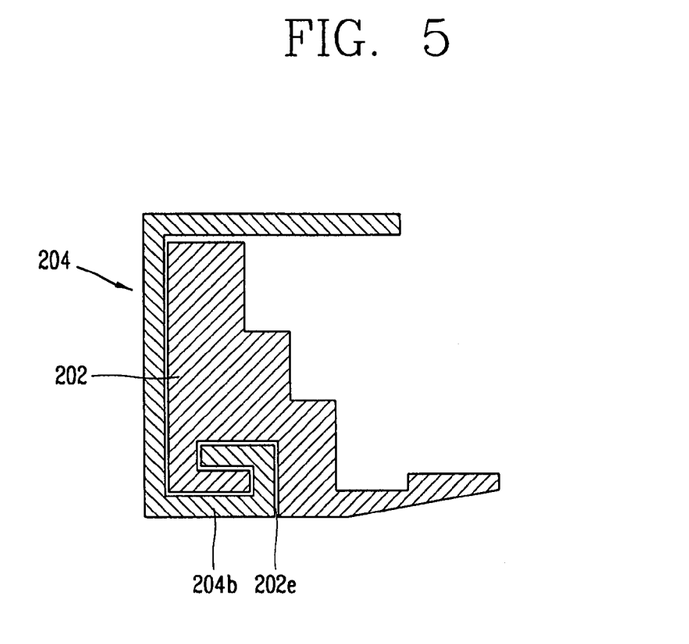
FIG. 5 is a cross-sectional view showing a coupling structure of a main support frame and a first upper cover of the case structure in accordance with a first embodiment of the present invention.
Figure 6:
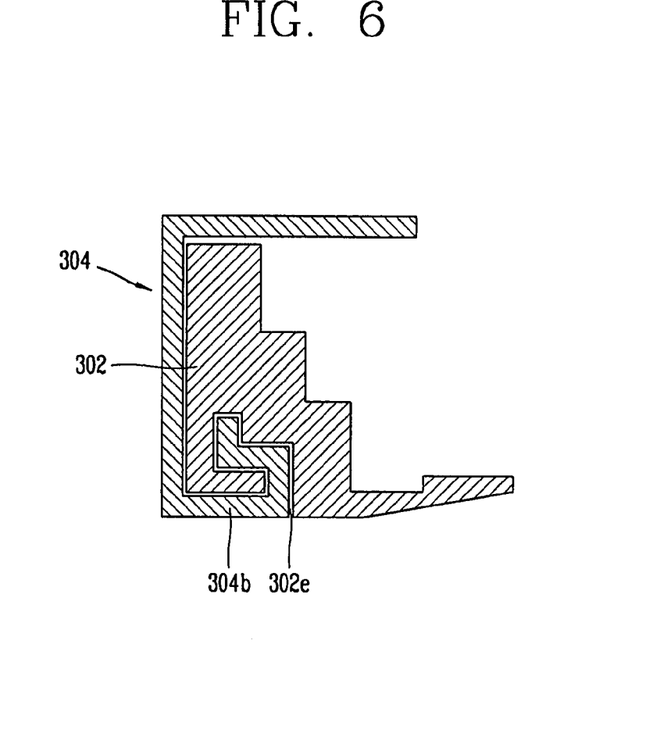
FIG. 6 is a cross-sectional view showing a coupling structure of a main support frame and a first upper cover of the case structure in accordance with a second embodiment of the present invention.
Figure 7:
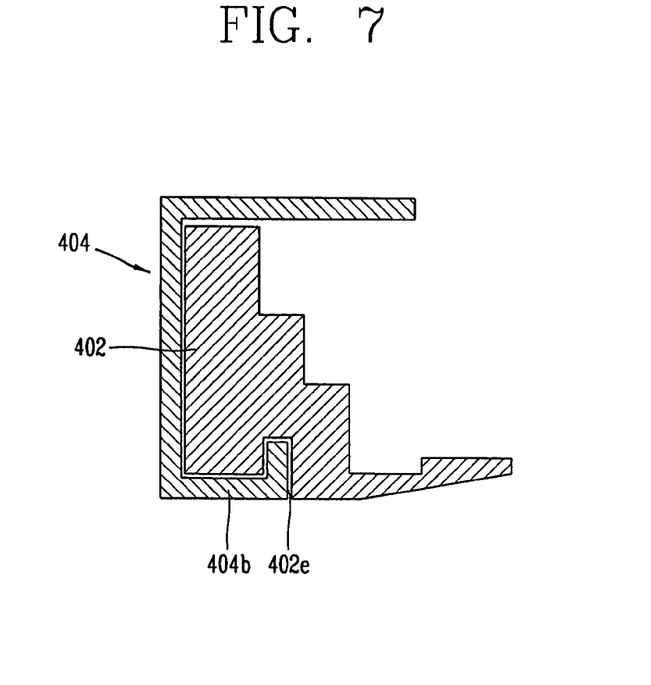
FIG. 7 is a cross-sectional view showing a coupling structure of a main support and a first front cover of the cast structure in accordance with a third embodiment of the present invention.

Considering the above points, FIGS. 5 to 7 show the slide groove portion and the slide protrusion portion, which hereinafter will be described in detail. Here, examples are suggested for a convenient description, but the invention is not limited to the structures of the slide groove portion and the slide protrusion portion shown in drawings, and various modifications and applications may be implemented in the range that follows the principles of the present invention.

FIG. 5 is a cross-sectional view showing the coupling structure of the main support frame 202 and the first upper cover 204 in accordance with a first embodiment, which is the same as the example already described above.

As shown in FIG. 5, the slide groove portion 202e formed in the main support frame 202 is formed inwardly from the rear surface, and is bent one time by at least 90 degrees to form the shape of an inverted "L". Here, the void space resulting from the formation of the slide groove portion 202e has a shape bent one time. The slide groove portions 202e extend along the entire length of the short sides of the main support frame 202, and the slide groove portions 202e are exposed to at least one side edge surface of the main support frame 202.

And, the slide protrusion portions 204b formed at the first upper cover 204 are slidingly coupled to corresponding slide groove portions 202e.

FIG. 6 is a cross-sectional view showing the coupling structure of a main support 302 and a first upper cover 304 in accordance with a second embodiment of the present invention.

As shown in FIG. 6, a slide groove portion 302e formed in the main support frame 302 is inwardly formed from the rear surface thereof, and is bent twice by at least 90 degrees each time. Here, each slide groove portion 302e has a shape like a '1' is extended upwardly from the upper leg of an inverted "L". The slide groove portions 302e extend the entire length of the short sides of the main support frame 302, and are exposed to at least one side edge surface of the main support frame 302.

And, slide protrusion portions 304b are formed at the first upper cover 304 so as to be coupled into corresponding slide groove portions 302e.

FIG. 7 is a cross-sectional view showing the coupling structure of a main support frame 402 and a first upper cover 404 in accordance with a third embodiment of the present invention.

As shown in FIG. 7, a slide groove portion 402e formed at the main support frame 402 is formed in the rear surface thereof, and has the shape of a '1'. The slide groove portions 402e extend the entire length of the short slides of the main support frame 402, and are exposed to at least one side edge surface of the main support frame 402.

And, a slide protrusion portion 404b is formed at each short side of the first upper cover 404 so as to be coupled to corresponding slide groove portions 402e.

In detail, in accordance with the present invention, the upper cover is divided into a first upper cover and a second upper cover, and slide coupling means are formed at the first upper cover and the main support frame, respectively, to implement an interlocking sliding coupling therebetween, whereby accordingly moisture infiltration into the LCD device is minimized, thereby enhancing the quality of the screen image of the LCD device.

Preferably, the slide coupling means formed at the main support frame and the first upper cover are properly designed so as to provide a tightly closure between the main support frame and the first upper cover and to permit the LCD device be implemented with an ultra thin and light type. Therefore, various modifications and applications are passible within the scope of the principles of the present invention.

In detail, infiltration of moisture is minimized by the slide coupling means formed at the main support frame and the first upper cover, but a tape attaching groove, a supporting bar and a waterproof pad may additionally be provided in order to more effectively prevent moisture infiltration.

As shown in FIGS. 3 and 4, it is preferable that a tape attaching recess or groove 202a is formed in the stepped portion in the main support frame 202 that is contacted with the reflection sheet 209 in the length direction of the stepped portion (that is, the X-axis direction in FIG. 3), and its depth is the same as or less than a thickness of a double-sided tape 210.

The double-sided tape 210 that is at least as thick as the depth of the tape attaching groove 202a is attached in the tape attaching groove 202a in the process of fabricating the main support frame 202 or of assembling the LCD device.

The double-sided tape 210 has a function of preventing moisture from being infiltrated into the LCD device by tightly sealing between the main support frame 202 and the reflection sheet 209.

Figure 8:
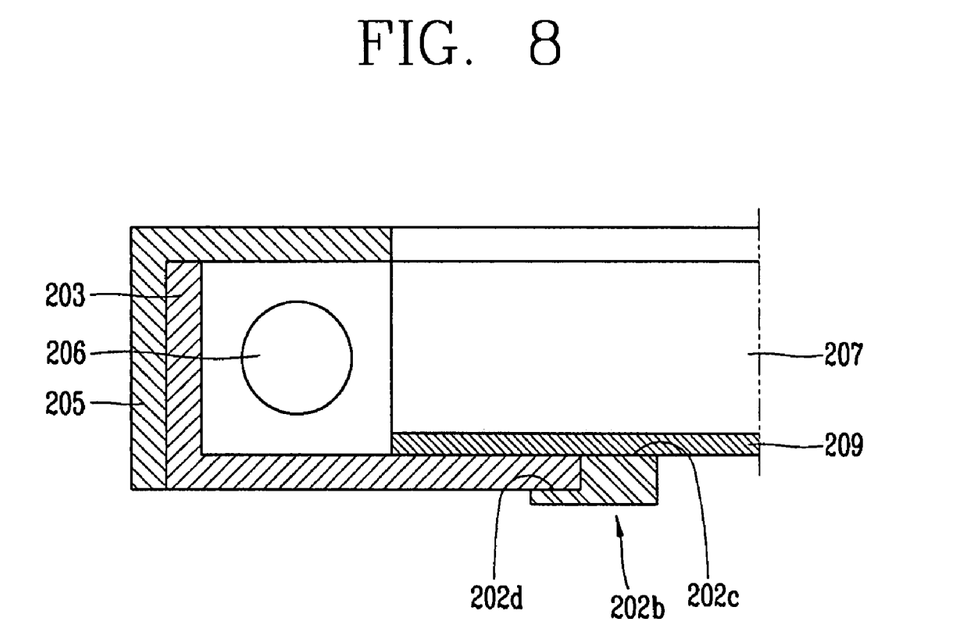
FIG. 8 is a cross-sectional view taken along line VIII-VIII in FIG. 3.

FIG. 8 is a cross-sectional view taken along the line V-V in FIG. 3 for describing the coupling relation of a supporting bar 202b, the lower cover 203 and the reflection sheet 209. Elements unnecessary for the description are excluded in the drawing.

As shown in FIGS. 3 and 8, a supporting bar 202b is disposed spanning the rear surface of the main support frame 202 at the portion thereof that is contacted by an edge of a long side of the rear edge of the first plate portion of lower cover 203.

The supporting bar 202b includes a first surface 202c abutted by the rear (bottom) surface of the reflection sheet 209 and a second surface 202d forming a space below the rear surface of the reflection sheet 209.

The lower cover 203, as earlier described, includes a first plate portion for covering the rear surface of the main support frame 202 and a second plate portion extended from the first plate portion and upwardly bent by the angle of 90 degrees.

The outer edge of the first plate portion of the lower cover 203 is coupled into the space formed between the second surface 202d of the supporting bar 202b and the reflection sheet 209, thereby tightly closing the gap between the reflection sheet 209 and the lower cover 203.

Also, it is possible to adhere the first surface 202c of the supporting bar 202b and the reflection sheet 209 to one another by using an adhesive material, thereby closing the gap between the reflection sheet 209 and the lower cover 203 more stably.

As shown in FIG. 4, a waterproof pad 211 is disposed inside the front cover where the upper surface of the liquid crystal panel 200 contacts with the inside of the first upper cover 204 and the second upper cover 205. The waterproof pad 211 is formed of a material that is flexible and has a smooth surface, such as silicone rubber.

The upper portions of the first and second upper covers 204, 205 at which the waterproof pad 211 are put under a tension downwardly, thereby preventing moisture from being introduced into the LCD device, at the gap between the first and second upper covers 204, 205 at which the waterproof pad 211 is formed and the liquid crystal panel 200. Preferably, the tension of the first and second upper covers 204, 205 is sufficient so as not to permit any gap between the waterproof pad 211 and the liquid crystal panel 200, while not damaging the liquid crystal panel 200.

As aforementioned, the present invention enables moisture not to infiltrate into the LCD device from the outside by transforming the main support frame and the upper cover in the LCD device and changing the coupling manner of the main support frame and the upper cover to a watertight sliding coupling.

Further, the present invention is capable of minimizing moisture infiltration into the LCD device by further providing the tape attaching groove, the supporting bar and the waterproof pad at the main support frame.

Therefore, the present invention is capable of implementing a high quality screen display of the LCD device as the generation of wrinkles in the optical sheet due to moisture infiltration is minimized.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
   a liquid crystal panel;
   a backlight assembly provided with a lamp and a reflection sheet for supplying light to the liquid crystal panel;

a main support frame for receiving the liquid crystal panel and the backlight assembly therein, and having slide groove portions therein;

a lower cover formed at an opened side of the main support frame where a lamp of the backlight assembly is disposed;

a first upper cover for covering one side of the main support frame and having slide protrusion portions therein, wherein the slide protrusion portions are inserted into the slide groove portions formed in the main support frame;

a second upper cover for covering another side of the main support frame; and a waterproof pad disposed between an inner portion of the first upper cover and an upper surface of the liquid crystal panel, and disposed between an inner portion of the second upper cover and the upper surface of the liquid crystal panel, wherein the slide groove portions are bent at least one time at both sides of the main support frame, and the slide protrusion portions are bent at least twice at both sides of the first upper cover.

2. The LCD device of claim 1, wherein the slide groove portions are bent at least one time by an angle of at least 90 degrees at both sides of the main support frame.

3. The LCD device of claim 1, wherein first coupling portions are formed at side ends of the first upper cover, and second coupling portions for being coupled with the first coupling portions are correspondingly formed at the main support frame.

4. The LCD device of claim 1, wherein a third coupling portions are formed at lateral surfaces of the second upper cover, and fourth coupling portions for being coupled with the third coupling portions are formed at the main support frame.

5. The LCD device of claim 1, wherein one or more stepped portions are formed inside of the main support frame, and a tape attaching groove is formed inside of the stepped portion that is contacted by reflection sheet of the backlight assembly in a lengthwise direction of the stepped portion and with a depth that corresponds to or is less than a thickness of a double-sided tape to be attached thereto.

6. The LCD device of claim 1, wherein one or more stepped portions are being extended from the main support frame to be contacted with the rear surface of the backlight assembly, and grooves are formed inside of the stepped portions, and a double-sided tape is attached in the grooves.

7. The LCD device of claim 1, wherein a supporting bar is formed at a rear surface of the main support frame at a portion thereof that is contacted by an end of a long side of the lower cover.

8. The LCD device of claim 7, wherein an upper surface of the supporting bar comprises a first surface contacted to the rear surface of a reflection sheet of the backlight assembly and a second surface contacted to a rear surface of the lower cover.

9. The LCD device of claim 8, wherein an end of the lower cover is located in space between the reflection sheet and the second surface.

10. The LCD device of claim 1, wherein an upper portions of the first upper cover and second upper cover at which the waterproof pad is formed have a downward tension toward a back portion of the liquid crystal panel.

11. The LCD device of claim 1, wherein the waterproof pad is formed of silicone.

12. A method for fabricating a liquid crystal display (LCD), the method comprising:

providing a main support frame for receiving a liquid crystal panel and having slide groove portions therein and a first upper cover for covering one side of the main support frame and having slide protrusion portions therein;

sliding the first upper the first upper cover into at least part of the main support frame to insert the sliding protrusion portions of the first upper cover with the sliding groove portions of the main support frame in the width direction of the main support frame, wherein the slide groove portions are bent at least one time at both sides of the main support frame, and the slide protrusion portions are bent at least twice at both sides of the first upper cover.

13. The method of claim 12, wherein the slide groove portions are bent at least one time by an angle of at least 90 degrees at both sides of the main support frame.

14. The method of claim 12, wherein the step sliding the first upper cover to the main support frame including:

aligning first coupling portions formed at side ends of the first upper cover with second coupling portions coupled with the first coupling portions coupled with the first coupling portions are correspondingly formed at the main support frame; and fixing the first coupling portions and second coupling portions.

15. The method of claim 12, further comprising:

introducing double-sided tapes in grooves of stepped portions of the main support frame;

attaching the double-sided tapes with the main support frame and the rear surface of the backlight assembly, wherein the stepped portions are formed inside of the main support frame, and the groove is formed inside of the stepped portion in a lengthwise direction of the stepped portion and with a depth that corresponds to or is less than a thickness of the double-sided tape to be attached thereto.

16. The method of claim 12, further comprising:

coupling the lower cover with a groove; and disposing the end portion of the lower cover between the rear surface of the backlight assembly and the extended portion of a supporting bar, wherein the supporting bar is formed between the two sides of the main support frame and the extended portion is extended from the rear surface of the supporting bar.

17. The method of claim 12, further comprising:

coupling the second upper cover with the remaining portion of the main support frame.

* * * * *